United States Patent [19]
Weidman

[11] Patent Number: 5,268,979
[45] Date of Patent: Dec. 7, 1993

[54] ACHROMATIC OVERCLAD FIBER OPTIC COUPLER

[75] Inventor: David L. Weidman, Corning, N.Y.

[73] Assignee: Corning Incorporated, Houghton Park, N.Y.

[21] Appl. No.: 913,390

[22] Filed: Jul. 15, 1992

[51] Int. Cl.$^5$ .............................. G02B 6/26
[52] U.S. Cl. ........................ 385/42; 385/43; 385/46; 385/48; 385/51; 385/126; 385/127
[58] Field of Search ............. 385/27, 28, 39, 43, 385/46, 48, 126, 127, 128, 144, 42, 51, 123

[56] References Cited

U.S. PATENT DOCUMENTS

| | | | |
|---|---|---|---|
| 4,763,976 | 8/1988 | Nolan et al. | 385/43 |
| 4,763,977 | 8/1988 | Kawasaki et al. | 385/42 |
| 4,773,924 | 9/1988 | Berkey | 65/3.11 |
| 4,799,949 | 1/1989 | Keck et al. | 65/3.12 |
| 4,877,300 | 10/1989 | Newhouse et al. | 385/43 |
| 5,011,251 | 4/1991 | Miller et al. | 385/43 |
| 5,044,716 | 9/1991 | Berkey | 385/51 |
| 5,058,978 | 10/1991 | Kondoh et al. | 385/43 |

Primary Examiner—Frank Gonzalez
Attorney, Agent, or Firm—W. J. Simmons, Jr.

[57] ABSTRACT

An achromatic fiber optic coupler of the type wherein a plurality of single-mode optical fibers, each having a core and a cladding, are fused together along a portion of the lengths thereof to form a coupling region. The propagation constants of the fibers are preferably equal; however if the fiber claddings have different refractive indices, the lowest cladding refractive index is $n_2$. A matrix glass body of refractive index $n_3$ surrounds the coupling region, $n_3$ being lower than $n_2$ by such an amount that the value of $\Delta_{2-3}$ is less than 0.125%, wherein $\Delta_{2-3}$ equals $(n_2^2 - n_3^2)2n_2^2$.

15 Claims, 6 Drawing Sheets

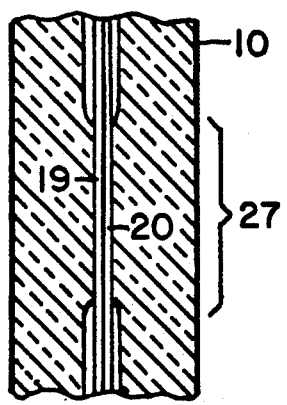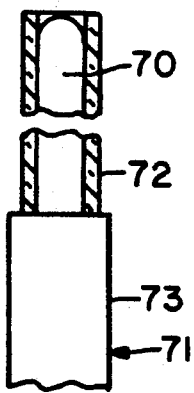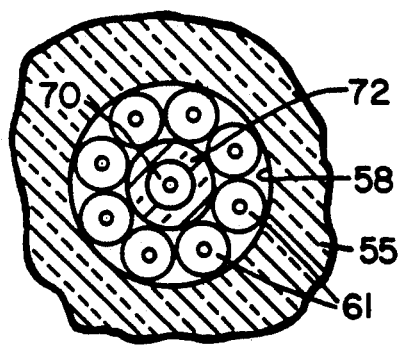
Fig. 9          Fig. 13          Fig. 14
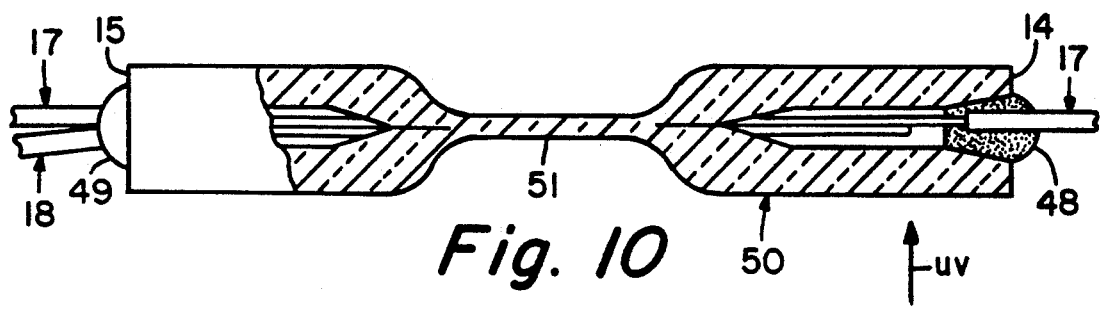
Fig. 10
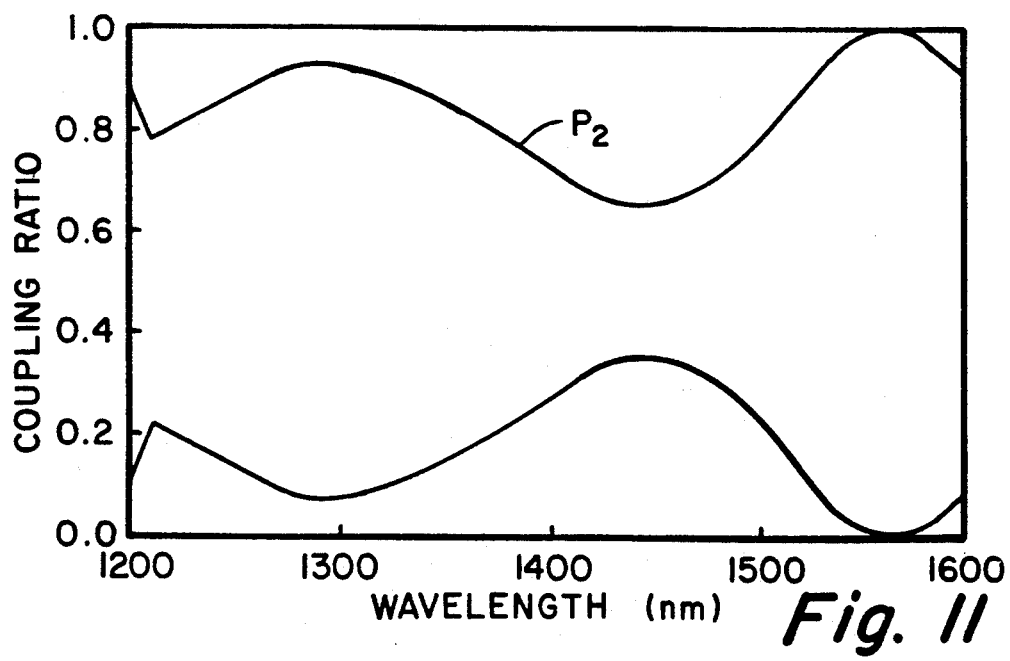
Fig. 11

ACHROMATIC OVERCLAD FIBER OPTIC COUPLER

BACKGROUND OF THE INVENTION

This invention relates to single-mode fiber optic couplers that are capable of effecting a relatively uniform coupling of light between fibers over a relatively broad band of wavelengths.

Fused fiber couplers have been formed by positioning a plurality of fibers in a side-by-side relationship along a suitable length thereof and fusing the claddings together to secure the fibers and reduce the spacings between the cores. Various coupler properties can be improved by inserting the fibers into a capillary tube prior to heating and stretching the fibers, thereby resulting in the formation of an "overclad coupler". To form an overclad coupler, the fibers are inserted into a tube, the tube is evacuated, and its midregion is heated and collapsed onto the fibers. The central portion of the midregion is thereafter drawn down to that diameter and coupling length which is necessary to obtain the desired coupling.

Identical optical fibers were heretofore used to make a standard coupler, the coupling ratio of which is very wavelength dependent, i.e. if it exhibits 3 dB coupling at 1310 nm it cannot function as a 3 dB coupler at 1550 nm because of that wavelength dependence. A "standard coupler" might be characterized in terms of its power transfer characteristics in a window centered about 1310 nm, which is referred to as the first window. For example, a standard coupler might exhibit a coupling ratio that does not vary more than about ±5% within a 60 nm window.

An "achromatic coupler" is one wherein the coupling ratio is less sensitive to wavelength than it is for a standard coupler. There is no widely accepted definition of an "achromatic coupler". The least stringent definition would merely require an achromatic coupler to exhibit better power transfer characteristics than the standard coupler in the first window. More realistically, the specification is tightened by requiring an achromatic coupler to perform much better than the standard coupler in that first window, or to require it to exhibit low power transfer slopes in two windows of specified widths. These windows might be specified, for example, as being 100 nm wide and centered around about 1310 nm and 1530 nm. These windows need not have the same width; their widths could be 80 nm and 60 nm, for example. An optimally performing achromatic coupler would be capable of exhibiting low values of coupled power slope over essentially the entire single-mode operating region. For silica-based optical fibers this operating region might be specified as being between 1260 nm and 1580 nm, for example.

In the following discussion, the relative refractive index difference $\Delta_{a-b}$ between two materials with refractive indices $n_a$ and $n_b$ is defined as $$\Delta_{a-b} = (n_a^2 - n_b^2)/(2n_a^2) \quad (1)$$

For simplicity of expression, $\Delta$ is often expressed in percent, i.e. one hundred times $\Delta$.

Heretofore, achromatic couplers were formed by employing fibers having different propagation constants for the fundamental mode in the coupling region, i.e. by using fibers of different diameter and/or fibers of different refractive index profile or by tapering or etching one of two identical fibers more than the other.

U.S. Pat. Nos. 5,011,251 and 5,044,716 teach overclad achromatic fiber optic couplers wherein the coupled fibers are surrounded by matrix glass having a refractive index $n_3$ that is lower than that of the fiber cladding material. The propagation constants of the coupler fibers are different since the fibers have different cladding refractive indices. The difference between the refractive index $n_2$ of the cladding of the first fiber and the refractive index $n_2'$ of the cladding of the second fiber is such that the coupler exhibits very little change in coupling ratio with wavelength over a relatively wide band of wavelengths.

U.S. Pat. Nos. 5,011,251 and 5,044,716 characterize the tube refractive index $n_3$ by the symbol $\Delta_{2-3}$, the value of which is obtained by substituting $n_2$ and $n_3$ for $n_a$ and $n_b$ in equation (1). Commercially available single-mode optical fibers usually have a value of $n_2$ that is equal to or near that of silica. If silica is employed as the base glass for the tube, a dopant is added thereto for the purpose of decreasing the tube refractive index $n_3$ to a value than $n_2$. Those patents state that in addition to lowering the refractive index of the tube, the dopant $B_2O_3$ also advantageously lowers the softening point temperature thereof to a value lower than that of the fibers. Fluorine has also been employed to lower the tube refractive index. Those patents teach that when $\Delta_{2-3}$ is below about 0.2%, the amount of $B_2O_3$ in a silica tube is insufficient to soften the tube glass in a 1×2 or a 2×2 coupler, whereby it excessively deforms the fibers during the collapse step. The value of $\Delta_{2-3}$ for standard couplers has therefore usually been between 0.26% and 0.35%. Those patents further state that process reproducibility of achromatic overclad couplers is enhanced by employing tubes having refractive indices such that $\Delta_{2-3}$ values are above that previously employed range, preferred values of $\Delta_{2-3}$ being greater than 0.4%.

SUMMARY OF THE INVENTION

It is an object of the invention to provide a single-mode achromatic fiber optic coupler that is characterized by a very small change in coupled power over a wide band of wavelengths. Another object is to provide an achromatic coupler, all optical fibers of which can be identical. A further object is to provide an achromatic fiber optic coupler of the type having N fibers surrounding the input fiber (N>2), wherein the coupling of power from the input to the output fibers is nearly 100%, whereby coupler loss is minimized.

The achromatic coupler of the invention comprises a plurality of optical waveguide paths extending through a body of matrix glass. Each of the paths comprising a core region surrounded by a cladding region of refractive index less than that of the core region, the lowest refractive index of the cladding regions of the paths is $n_2$. The optical waveguide paths extend in sufficiently close proximity for a sufficiently long distance that a portion of the optical power propagating in one of the paths couples to the other of the paths. The refractive index of at least that region of the body adjacent the paths is $n_3$, where $n_3$ is lower than $n_2$ by such an amount that the value of $\Delta_{2-3}$ is less than 0.125%.

In one embodiment, the waveguide paths comprise optical fibers and the matrix glass is a cylindrically-shaped body through which the fibers longitudinally extend. The body has first and second opposed ends and a midregion. The diameter of the central portion of the midregion and the diameters of the optical fibers in the central portion of the midregion are smaller than the diameters thereof at the ends of the body.

The achromatic fiber optic coupler of the present invention is formed by inserting into a glass tube at least a portion of each of a plurality of optical fibers so that the portions occupy the midregion of the tube. Each of the fibers comprises a core of refractive index $n_1$ and a cladding of refractive index less than $n_1$. The lowest cladding refractive index of any of the fibers, which is $n_2$, is greater than $n_3$ by such an amount that the value of $\Delta_{2-3}$ is less than 0.125%, wherein $\Delta_{2-3}$ equals $(n_2^2 - n_3^2)/2n_2^2$. The midregion of the tube is collapsed onto fibers, and the central portion of the midregion is stretched until a predetermined coupling occurs between the fibers.

BRIEF DESCRIPTION OF THE DRAWINGS

FIG. 9 is a partial cross-sectional view illustrating the collapse of the glass tube around the fibers to form a solid midregion.

FIG. 10 is a partial cross-sectional illustration of a fiber optic coupler after it has been drawn down and sealed at its ends.

FIG. 11 is a graph illustrating spectral coupling ratio curves for an achromatic 2×2 coupler produced by the method of Example 1.

FIG. 13 is a cross-sectional view showing a spacer tube on the end of a fiber.

FIG. 14 is a fragmentary cross-sectional view of the coupler preform of FIG. 12 after all optical fibers have been inserted therein.

DETAILED DESCRIPTION OF THE INVENTION

The drawings are not intended to indicate scale or relative proportions of the elements shown therein.

Fiber optic couplers can be characterized by the number of optical fibers that extend from each end thereof, by the fraction of input power that is coupled to a particular output fiber, and by the wavelength sensitivity of the coupling. In an M×N coupler, where $M \geq 1$ and $N \geq 2$, M optical fibers extend from one end and N fibers extend from the other end. A 3 dB coupler, for example, is a 1×2 or 2×2 coupler that couples 50% of the power from a first fiber to a second fiber. A tap is a coupler (usually a 1×2 or 2×2 coupler) that couples less than 50% of the input power, usually a small percentage such as 3%, 10% or the like, to one output fiber. A splitter (a 1×N, where N>2 ) equally divides the input power among the N output fibers. A switch is a coupler (usually a 1×2 or 2×2 coupler) that is packaged such that the percentage of power coupled from a first optical fiber to a second fiber can be changed by changing the angle at which the two fibers are bent in the plane of the two fibers (see U.S. Pat. No. 4,763,977). A switch typically couples virtually all light from the input fiber to the second fiber at the operating wavelengths. The present invention concerns achromatic fiber optic couplers, and it has relevance to all of the above-mentioned coupler types.

Figure 1:
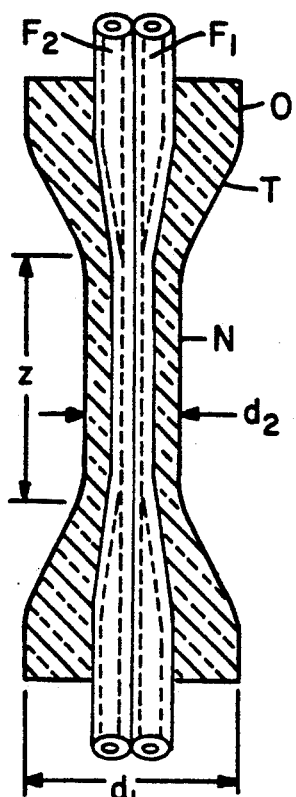
FIG. 1 is a cross-sectional view of an overclad 2×2 coupler.

FIG. 1 schematically illustrates a 2×2 coupler wherein each of the optical fibers $F_1$ and $F_2$ has a core of refractive index $n_1$ surrounded by cladding of refractive index lower than $n_1$. For a general discussion of the present invention, the 2×2 coupler is deemed to be typical of all of the aforementioned types of couplers. The coupler can be formed by threading fibers $F_1$ and $F_2$ through glass overclad tube O, the refractive index $n_3$ of which is less than the refractive indices of the fiber claddings. Whereas those portions of the fibers extending from the tube preferably have protective coating material (not shown in this illustrative embodiment), those portions thereof within the tube midregion have no coating. The original diameter of the tube is $d_1$. Tube O is evacuated, and the midregion thereof is heated to collapse it onto the fibers. The tube is reheated, and its ends are pulled in opposite directions to stretch the central portion of the collapsed midregion. The tube collapse and stretching operations can be performed in accordance with U.S. Pat. No. 5,011,251, the teachings of which are incorporated herein by reference. The rate at which the two tube ends move away from each other constitutes the combined stretch rate. The tube can be stretched at a constant rate, or the stretch rate can vary continuously or in discrete steps. The stretching operation can stop after a predetermined coupling is achieved; thereafter, the tube can be reheated, and stretching can occur at a second stretch rate. The ratio of the original diameter $d_1$ to the diameter $d_2$ of the central portion of neckdown region N is referred to as the draw ratio R. Region N is illustrated as having a constant diameter even though a slight taper exists therein, whereby the longitudinal center of section N exhibits the minimum diameter. The coupling characteristics of the resultant coupler are determined by such parameters as the optical and mechanical characteristics of the tube O and fibers $F_1$ and $F_2$ and of the coupler parameters such as length z, neckdown region N, and tapered regions T.

Optical power can be coupled to an input optical fiber, and the output signals can be monitored to control process steps in the coupler manufacturing process. See, for example, U.S. Pat. No. 5,011,251. In the specific examples described below, output power was not monitored during stretching. In previous experience with overclad fiber optic couplers, the total stretching distance for both stages was usually between 12 and 16 mm. The couplers described in these examples were therefore initially elongated by some distance within that range. The optical characteristics of the resultant device were measured, and the stretching or elongation distance of the subsequently made coupler was adjusted in such a manner as to more nearly achieve the desired characteristics. By this process, the optimal stretching distance was achieved. Thereafter, all couplers of that type were stretched the optimal distance in order to achieve the desired optical characteristics. However, process parameters such as the elongation distance can be fine tuned as a result of optical characterization of the produced couplers.

A theoretical analysis was made of achromatic couplers using coupled mode theory to model their behavior. The analysis was based on the principles taught in the publication, A.W. Snyder and J.D. Love, *Optical Waveguide Theory*, Chapman and Hall, N.Y., 1983. The types of couplers analyzed were 1×6 and 1×8 splitters, 2×2 3dB couplers, 2×2 switches and 2×2 90%–10% taps. In accordance with this theory, the mode field of the 2×2 overclad coupler of FIG. 1 is assumed to be a linear combination of the fundamental modes $\psi_1$ and $\psi_2$ of each of the fibers $F_1$ and $F_2$ in the absence of the other fiber, i.e. with the fiber surrounded by only overclad index material $n_3$. The propagation constants and mode fields can be determined exactly for such a structure (see M.J. Adams, *An Introduction to Otical Wavecuides*).

The coupling constant which describes the optical coupling between the two cores can then be written as an overlap integral:

$$C = \int \psi_1(r)\psi_2(r')(n-n')dA \qquad (2)$$

In this equation, $\psi_1$ and $\psi_2$ are the mode fields of the two cores, r and r' are the radial distances from the center of the cores of fibers $F_1$ and $F_2$, respectively, n is the index structure of the entire coupler, n' is the index structure with the core of $F_1$ replaced by overcladding material of index $n_3$, and the integral is over the entire cross-section of the coupler (but n—n' is only non-zero over the core and cladding of fiber $F_1$). The mode fields are assumed to be normalized in this equation, i.e. the integrals $\int \psi_1^2 dA$ and $\psi_2^2 dA$ both equal 1.

While these are tapered devices, their qualitative behavior is adequately modeled by assuming a constant draw ratio over a given coupling length, with no coupling outside this length, i.e. assuming that the diameter of region N of FIG. 1 is constant over the entire length z. This approximation works well since the coupling constant is a rapidly increasing function of draw ratio, and thus the behavior of a coupler is dominated by the behavior at the highest draw ratio. Using this approximation, with the power launched into core 1, then, as a function of z, the length along the coupler axis, the power in the two cores is given by $$P_1(z) = 1 - F^2 \sin^2(Cz/F) \qquad (3)$$

and $$P_2(z) = F^2 \sin^2\left(\frac{C}{F}z\right) \qquad (4)$$

where the factor F is given by $$F = \left| 1 + \left(\frac{\beta_1 - \beta_2}{2C}\right)^{-1} \right| \qquad (5)$$

where $\beta_1$ and $\beta_2$ are the propagation constants of fibers $F_1$ and $F_2$, respectively.

Results can be made more quantitative by inteqrating the coupling equations along the taper. Still more accurate simulations may be done using beam propagation techniques (Fourier transform, finite difference, etc.), although at the cost of much increased computational time.

Figure 3:
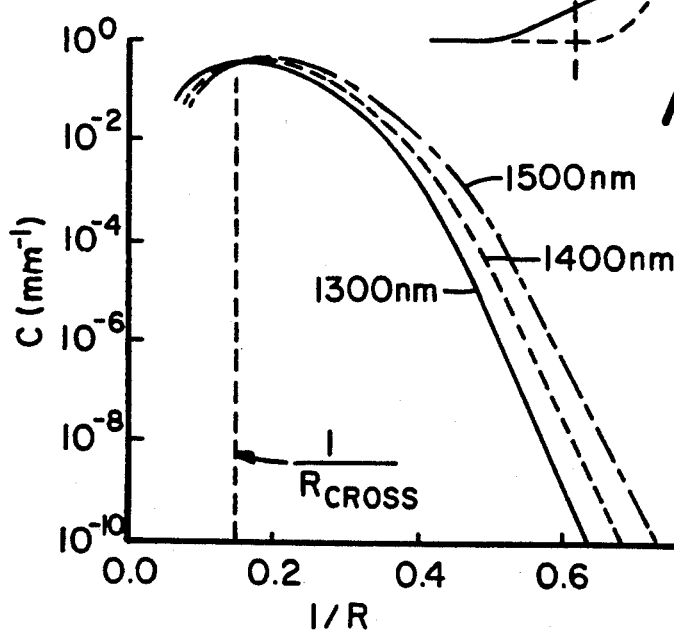
FIG. 3 is a graph of coupling constant v. inverse draw ratio at three different wavelengths for a 2×2 switch coupler having a $\Delta_{2-3}$ value of 0.35%.

The coupled mode model was used to determine the coupling constant for a 2×2 coupler as a function of draw ratio for three different wavelengths in a coupler with a $\Delta_{2-3}$ value of 0.35%. Most of the assumptions which were made concerning coupler parameters are based on work done on standard overclad couplers. Fibers $F_1$ and $F_2$ were assumed to be standard 125 μm outside diameter single-mode fibers having a core radius of 4 μm. The core and claddinq refractive indices $n_1$ and $n_2$ were assumed to be 1.461000 and 1.455438, respectively. The model was used to generate the graph of FIG. 3, which illustrates the physical mechanism responsible for the improvement in achromaticity of the couplers of the present invention. In FIG. 3, the coupling constant is plotted as a function of inverse draw ratio for a parallel core 2×2 coupler. It can be seen that the coupling constant at a given wavelength increases very rapidly with increased draw ratio. However, at very large draw ratios there is a maximum in the curves. This is caused by the fact that eventually the mode field expansion becomes so large that the overlap between the mode fields of the two fibers, in the region consisting of the core and cladding of one of the fibers (which is where the coupling constant overlap integral is taken), actually decreases because of decreasing mode field amplitude. At draw ratios significantly smaller than that at the maximum, the coupling constant at the longer wavelengths is larger because its expansion is larger due to diffractive effects. However, this fact implies that the maximum coupling at the longer wavelengths occurs at a smaller draw ratio since the draw ratio at which maximum coupling occurs is determined by the point at which further mode field expansion decreases the amount which the mode field from one core overlaps that from the other core. Since the mode field expansion is greater at longer wavelengths for a given draw ratio, the maximum occurs at smaller values of R for longer wavelengths. As illustrated in FIG. 3, this causes the coupling constant curves to intersect.

In a nontapered parallel core device having a single draw ratio (see FIG. 1), in order to obtain achromatic performance (e.g. equal coupling at about 1300 and 1500 nm), the coupler geometry would be chosen so as to operate at the crossover point of the coupling constant curves, $R_{CROSS}$ for the two wavelengths as illustrated in FIG. 3. In a tapered device, which has a geometry which includes all draw ratios up to a maximum, $R_{MAX}$, it is necessary to have $R_{MAX} > R_{CROSS}$ (to have $1/R_{MAX}$ to the left of the crossover point in FIG. 3). This is because at low draw ratios near the ends of the taper (see region LW between dashed lines 5 and 6 of FIG. 4), the coupling is stronger at longer wavelengths, and so long wavelength light couples more. By tapering such that $R_{MAX} > R_{CROSS}$, the coupler also includes a region SW (between dashed lines 4 and 5) where the coupling is stronger at shorter wavelengths, thereby compensating for the small draw ratio region. Regions SW and LW pertain to the taper of tube 3b of FIG. 4. The exact value of $R_{MAX}$ must be determined by numerical integration of the coupling equations over the tapered device.

Figure 4:
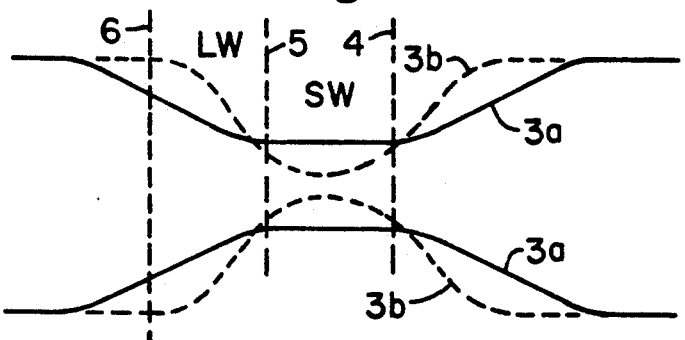
FIG. 4 is a schematic illustration of the outer surfaces of two tubes having different draw ratios and different coupling distances but similar coupling.

From FIG. 3 and the previous discussion related thereto, it can be seen that a draw ratio of about 10:1 would be needed to form an achromatic coupler wherein $\Delta_{2-3}$ is 0.35%. Such a high draw ratio can result in a relatively high excess loss for the following reason. Higher draw ratios cause an increase in coupling strength, thereby necessitating a shorter coupling distance z. This relationship is illustrated in FIG. 4 wherein the outer surfaces of two stretched tubes 3a and 3b are illustrated by solid and dashed lines, respectively. Since tube 3b has a larger draw ratio than tube 3a, tube 3b must have a shorter coupling distance z than tube 3a to achieve the same coupling (on the first cycle of the power transfer curve). The power transfer curve is discussed in U.S. Pat. No. 5,011,251 in connection with FIG. 6 of that patent.

It is known that undesirable mode coupling from the fundamental $LP_{01}$ mode to higher modes becomes stronger for the steeper tapers of the high draw ratio/short coupling region of tube 3b. This nonadiabatic coupling can increase the coupler excess loss.

The aforementioned model was used to calculate the theoretically required taper parameters for $1 \times 2$ double window switches. A description of the draw ratio of a tapered coupler as a function of distance z along its length (origin of z at the maximum draw ratio point) can be simply given as a gaussian function involving the maximum draw ratio, $R_{MAX}$, and the gaussian width parameter, $\omega_o$. It is given by $$R(z) = 1 + (R_{MAX} - 1)exp[-(z/\omega_o)^2] \quad (6)$$

Typical values of these parameters for a standard $2 \times 2$ WDM coupler are $R_{MAX}$ from 3 to 6 and $\omega_o$ from 3000 to 6000 μm. The model revealed that values of the parameters $R_{MAX}$ and $\omega_o$ are in the range of current coupler values for very small values of $\Delta_{2-3}$. By "current coupler" is meant overclad couplers of the type disclosed in U.S. Pat. No. 5,011,251, wherein $\Delta_{2-3}$ is greater than 0.26%. The lower values of $\Delta_{2-3}$ will displace the curves of FIG. 3 to the right (toward lower values of draw ratio) and down (toward smaller values of maximum coupling constant), whereby achromatic couplers having easily achievable draw ratios can be formed. As the value of $\Delta_{2-3}$ is made smaller, the required value of $R_{MAX}$ becomes smaller, and the needed coupling length (indicated by the gaussian width parameter, $\omega_o$) becomes longer. Thus the taper becomes less steep.

A theoretical maximum to the $\Delta_{2-3}$ value which can be used may be obtained by considering limitations due to nonadiabatic mode coupling. The propagation constants ($\beta$) were calculated for the $LP_{01}$ and $LP_{02}$ modes. The $LP_{02}$ mode is the lowest order mode that couples to the $LP_{01}$ mode in an ideal, matched fiber coupler. From equation (6) and the $\beta$s of the $LP_{01}$ and $LP_{02}$ modes, the parameters $1/a|da/dz|$ and $K\frac{1}{2}\pi[\beta(LP_{01}) - \beta(LP_{02})]$ were determined, where a is the core radius and z is the distance as measured along the coupler axis. For adiabatic performance, the following relationship must exist:

$$\frac{1}{2}\pi[\beta(LP_{01}) - \beta(LP_{02})] - 1/a|da/dz| > 0 \quad (7)$$

Figure 5:
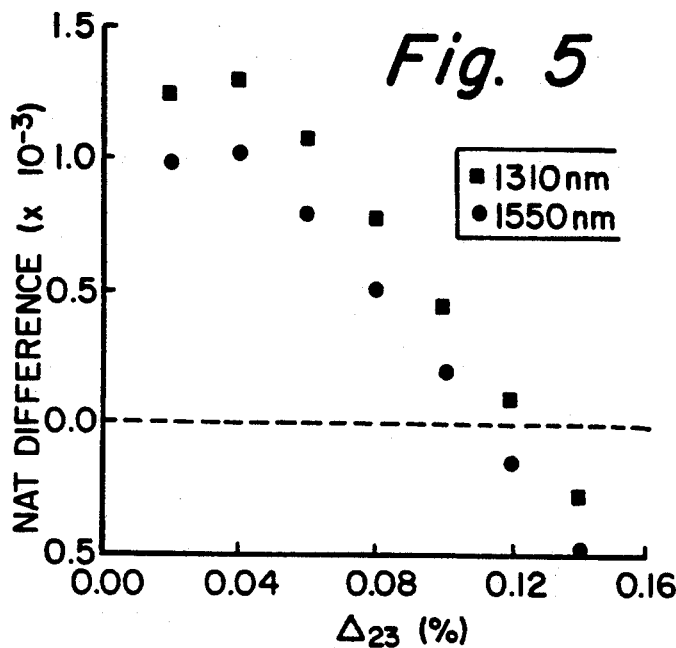
FIG. 5 is a graph wherein the "NAT Difference", the difference parameter of equation (7), is plotted as a function of $\Delta_{2-3}$ in for wavelengths of 1310 nm and 1550 nm.

The difference parameter of equation (7), referred to herein as the "NAT Difference", is plotted as a function of $\Delta_{2-3}$ in FIG. 5 for wavelengths of 1310 and 1550 nm. The NAT Difference was calculated for $\Delta_{2-3}$ values from 0.02% to 0.14% at each of the two wavelengths. The 1300 nm curve experiences a NAT Difference of zero at a maximum possible theoretical $\Delta_{2-3}$ value of about 0.125%.

Figure 8:
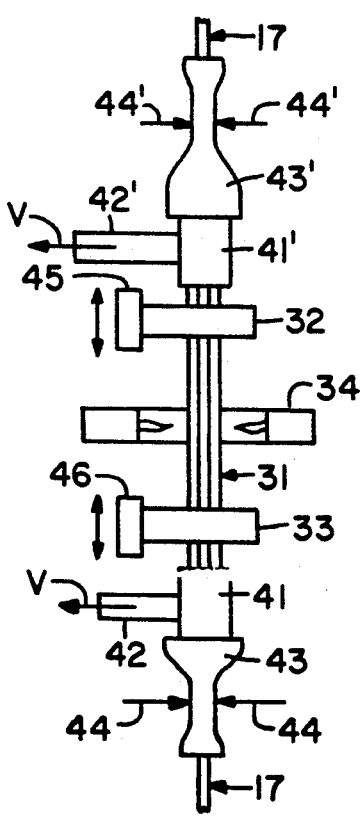
FIG. 8 is a schematic illustration of an apparatus for collapsing a capillary tube and stretching the midregion thereof.

From practical experience, it was found that significant achromaticity improvements can be obtained with $\Delta_{2-3}$ values of about 0.045% or less at wavelengths in 1300–1550 nm range. With the tapers that could be achieved on draw equipment of the type illustrated in FIG. 8, achromatic couplers could not be formed when $\Delta_{2-3}$ was 0.09%. However, in order to form achromatic couplers at $\Delta_{2-3}$ values greater than 0.045%, tubes having smaller outside diameters could be employed, and a burner able to provide a smaller, more tightly focused flame could be used. Best results have been obtained with $\Delta_{2-3}$ values of about 0.01% to 0.02%. The lower limit of measurement capability of $\Delta_{2-3}$ is 0.01%.

The above discussion details the invention in the context of $2 \times 2$ couplers. The same physical phenomena lead to the application of the principles of the invention to $M \times N$ couplers. Of particular interest in many passive optical networks is the $1 \times N$ splitter.

Figure 2:
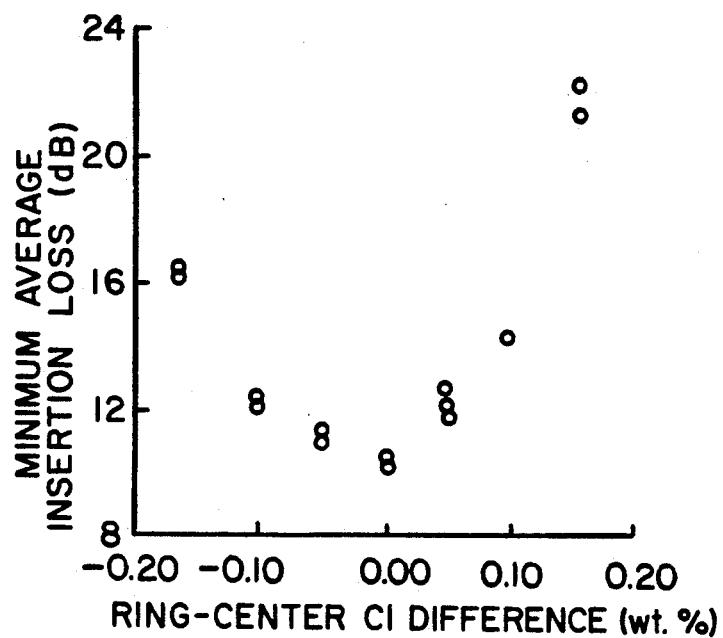
FIG. 2 is a graph of minimum average insertion loss v. ring fiber-to-center fiber chlorine difference for a 1×8 coupler.

In one type of coupler referred to as a power splitter, a central input fiber is surrounded by a plurality of equally spaced output ring fibers in the coupling region. A $1 \times N$ power splitter can be formed such that N fibers are disposed around one input fiber; in such a device, the input fiber should retain as little power as possible. In such a coupler the central fiber and the ring fibers preferably have "substantially matched propagation constants". Experiments were performed to ascertain the effect of $\Delta\beta$ (the difference in propagation constants between the central fiber and the ring fibers) on insertion loss for $1 \times 8$ splitters in which eight ring fibers are disposed around a central fiber (a thin glass spacer tube was located between central and ring fibers). A difference between the propagation constants of the central fiber and the outer or ring fibers was introduced by doping the fiber claddings with different amounts of chlorine. As shown in FIG. 2, wherein $\Delta_{2-3}$ is about 0.02%, insertion loss was lowest when the ring and central fibers were identical. It is an advantage of this type of $1 \times N$ splitter that all of the optical fibers utilized therein can be standard telecommunication fibers.

In another type of $1 \times N$ splitter, N-1 fibers are disposed around one input fiber, and one-Nth of the input power remains in the input fiber, which functions as one of the N output fibers. In order to equalize the power in all of the fibers, including the central fiber, it may be advantageous to employ an inner fiber having a slightly different propagation constant than the rinq fibers. Based on the teachings of U.S. Pat. No. 5,011,251, it is thought that a maximum $\Delta\beta$ of about 0.002 $\mu m^{-1}$ might be useful in such a coupler. Such a $\Delta\beta$ value can be obtained by employing a central fiber having slightly different cladding refractive index than the ring fibers. The difference between the lowest refractive index $n_2$ and the highest fiber cladding refractive index $n_2'$ should be sufficiently small that $\Delta_{CLADS}$ will preferably be less than 0.03%. The value of $\Delta_{CLADS}$ is obtained by substituting the cladding indices $n_2$ and $n_2'$ for $n_a$ and $n_b$ of equation (1) and solving for $\Delta$. In the event that the claddinqs of the fibers have slightly different refractive indices, the lowest refractive index $n_2$ is to be used for the purpose of calculating $\Delta_{2\text{-}3}$.

The coupled mode theory can be generalized to the case of N fibers around 1 fiber (N>2) (see, for example, FIGS. 14 and 19-21). The coupling constant between any two fibers is defined as it was in the 2×2 case. The index structure in this case is too complicated to solve without further simplification or more complicated modeling. As a first approximation, the following case was considered: all fibers except for the two in question are replaced by overcladding index material. This then allows exact solution. If only nearest-neighbor coupling is considered (usually a good approximation), and it is assumed that power is input into the central fiber, then the power as a function of length in any one of the ring fibers is given by $$P_j(z) = F^2/N \sin^2(Cz/F) j=1, \ldots, N \quad (8)$$

where $$F^2 = \frac{1}{1 + \frac{(\beta_0 - \beta_1 - 2C_{12})^2}{4C^2}} \quad (9)$$

$\beta_o$ is the propagation constant of the central fiber; $\beta_1$ is the propagation constant of the ring fibers, all of which are assumed to be identical (the model can be extended to non-identical); $C = N^{\frac{1}{2}} C_{01}$; $C_{01}$ is the coupling between central and each ring fiber ($C_{01} = C_{02} = \ldots = C_{0N}$); and $C_{12}$ is the coupling between adjacent ring fibers ($C_{12} = C_{23} = \ldots$).

The central fiber power, which is assumed to be 1 on input, is given by $$P_0(Z) = 1 - F^2 \sin^2(Cz/F) \quad (10)$$

The physical mechanism leading to improved achromaticity in an M×N coupler is identical to that leading to achromaticity improvements in a 2×2 coupler. Further, the improvements are similar for similar $\Delta_{2\text{-}3}$ values, and the nonadiabatic mode coupling limitations are also thought to be similar. Thus, a similar range of $\Delta_{2\text{-}3}$ values should give optimum functionality for M×N couplers as for 2×2 couplers.

There are a number of different approaches that can be taken to achieve the required very small values of $\Delta_{2\text{-}3}$. One approach involves the use of a pure $SiO_2$ tube and optical fibers having chlorine doped claddings to provide them with a refractive index greater than that of the silica tube. This technique provides good control of refractive index of both tube and fiber cladding. Polarization variability was good. The major disadvantage of this combination of glasses was that it resulted in very little difference in viscosity between the tube and the fibers. This caused the fibers to deform and resulted in relatively high excess loss.

Commercially available single-mode optical fibers usually have a value of $n_2$ that is equal to or near that of silica. When this type of fiber is employed, the tube can be formed of silica doped with a small amount of $B_2O_3$ (in the range of 0.15 wt. % to 1.0 wt. %). The $B_2O_3$ softens the tube glass relative to the fiber cladding glass, thereby resulting in the formation of couplers having low excess loss. If the tube is formed of $SiO_2$ doped with more than 2.0 wt. % $B_2O_3$, the fibers can be clad with a glass comprising $SiO_2$ doped with a sufficient amount of fluorine to depress the cladding refractive index to the level necessary to provide a $\Delta_{2\text{-}3}$ value less than 0.125%.

A further approach is to form the tube from a base glass doped with one or more refractive index-decreasing dopants such as $B_2O_3$ and fluorine and one or more refractive index-increasing dopants such as $GeO_2$ and $TiO_2$. The combination of the two types of dopants provides a refractive index $n_3$ that results in the desired value of $\Delta_{2\text{-}3}$. Employing tubes of relatively soft glass enhances to a certain extent the collapsing of the tube onto the fibers; the tube glass flows around the fibers without distorting their shape.

Tube O is preferably made by a vapor deposition technique sometimes referred to as the flame hydrolysis process (see U.S. patent application Ser. No. 07/809,697 filed Dec. 16, 1991). The tube could also be formed from melted glass or by a sol gel technique.

Figure 6:
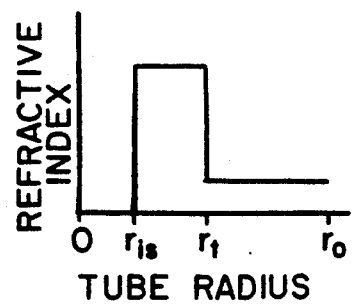
FIG. 6 is a graph of refractive index plotted as a function of tube radius for one type of tube.

Tubes having radial changes in composition have also been employed to make achromatic couplers. The inner region of the tube adjacent the tube bore is formed of a composition that provides the desired value of $\Delta_{2\text{-}3}$. The remainder of the tube can be formed of one or more regions having refractive indices that differ from the inner region. Reference is made to FIG. 6. For example, the inner region of the tube between the inner surface $r_{is}$ and transition radius $r_t$ can contain a small amount of $B_2O_3$ within the range of 0.15 wt. % and 2.0 wt. % to provide a sufficiently low value of $\Delta_{2\text{-}3}$ to provide the coupler with achromaticity. The outer tube region between $r_t$ and the outer surface $r_o$ may contain a higher concentration of $B_2O_3$ than the inner region. The higher $B_2O_3$ concentration results in a lower refractive index region, thereby better confining the optical power. Couplers having similar excess losses have been achieved using both substantially constant radial refractive index tubes and tubes having a step decrease in refractive index with radius.

Whereas the preferred manufacturing technique results in a coupler having optical fiber pigtails extending therefrom, the invention also applies to overclad couplers of the type wherein the fibers extend through the elongated matrix glass body but end flush with the body endface. Methods of making such a coupler are disclosed in U.S. Pat. Nos. 4,773,924 and 4,799,949. Briefly the method comprises inserting a plurality of optical fiber preform rods into a glass tube, heating and stretching the resultant preform to form a glass rod which is then severed into a plurality of units. Heat is applied to the central region of each unit, and the central region is stretched to form a tapered region as described herein.

EXAMPLE 1

A method of making a 1×2 achromatic fiber optic double window switch is illustrated in FIGS. 7-10. A glass capillary tube 10 having a 3.8 cm length, 2.8 mm outside diameter, and 265 μm longitudinal bore diameter was employed. Tube 10, which was formed by a flame hydrolysis process, had a refractive index gradient of the type shown in FIG. 6. The inner region between $r_{is}$ and $r_t$ consisted of silica doped with about 8.0 wt. % $B_2O_3$ and 2.5 wt. % $GeO_2$. The outer region between $r_t$ and $r_o$ consisted of silica doped with about 8 wt. % $B_2O_3$. The thickness of the inner region was 300 μm. The value of $\Delta_{2-3}$ was measured optically to be 0.02%.

Coated fibers 17 and 18 comprised 125 μm diameter single-mode optical fibers 19 and 20 having a 250 μm diameter urethane acrylate coatings 21 and 22, respectively. Both fibers had an 8 μm diameter core of silica doped with 8.5 wt. % $GeO_2$. The cutoff wavelengths of the fibers are below the operating wavelength of the coupler. If, for example, the minimum operating wavelength is 1260 nm, the cutoff wavelengths of the fibers are selected to be between 1200 nm and 1250 nm. These fibers, which were standard telecommunication fibers, were made in accordance with the teachings of U.S. Patent No. 5,011,251.

A 6 cm long section of coating was removed from the end of a 1.5 meter length of coated fiber 18. An antireflection termination was formed on the end of fiber 18 by directing a flame at the center of the stripped region of fiber, while the end of the fiber was pulled and severed to form a tapered end. The tip of fiber 20 was heated by a burner flame to cause the glass to recede and form a rounded endface, the diameter of which was equal to or slightly smaller than the original uncoated fiber diameter. The resultant stripped end region was about 3.2 cm long.

Approximately 3.2 cm of coating was stripped from the central region of a 3 meter length of fiber 17. The uncoated sections of fibers 17 and 18 were wiped, and a small amount of ethyl alcohol was squirted into the tube to temporarily lubricate the fibers during the insertion process.

Figure 7:
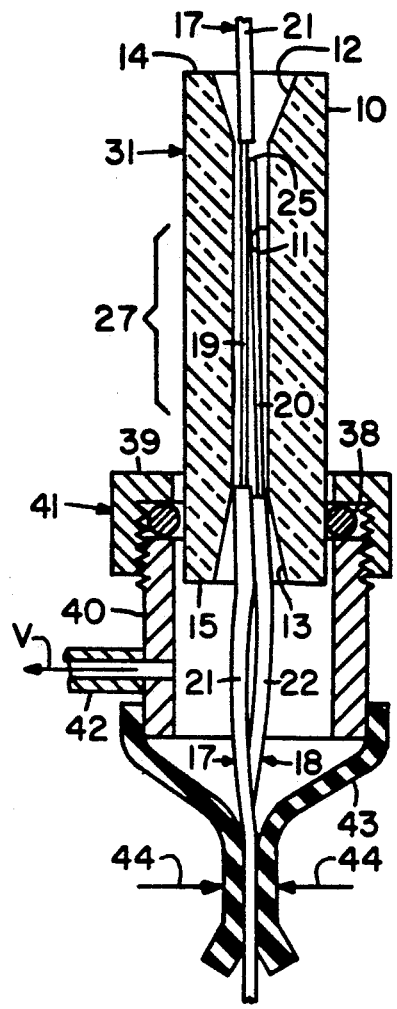
FIG. 7 is a cross-sectional view of a capillary tube after optical fibers have been inserted therein and after it has had a vacuum clamp attached to one end.

Coated fiber 17 was inserted through bore 11 until its uncoated portion was situated below tube end 15. The uncoated portion of coated fiber 18 was held adjacent the uncoated portion of coated fiber 17, and both were moved together toward tube end 14 until the coating end regions were interior to funnel 13. The uncoated portion of coated fiber 17 was then disposed intermediate end surfaces 14 and 15. End 25 of fiber 18 was located between midregion 27 and end 14 of tube 10. A small amount of UV-curable adhesive was applied to fibers 17 and 18 near end 15 to tack them to funnel 13 and to fiber 17 near end 14 to tack it to funnel 12. Preform 31 was then inserted through ring burner 34 (FIG. 8) and was clamped to draw chucks 32 and 33. The chucks were mounted on motor controlled stages 45 and 46. The fibers were threaded through the vacuum attachments 41 and 41', which were then attached to the ends of preform 31. Referring to FIG. 7, vacuum attachment 41 was slid over the end of tube 10, and collar 39 was tightened, thereby compressing O-ring 38 against the tube. Vacuum line 42 was connected to tube 40. One end of a length of thin rubber tubing 43 was attached to that end of vacuum attachment 41 opposite preform 31; the remaining end of the tubing extending within tube clamping means. Upper vacuum attachment 41' was similarly associated with line 42', tubing 43' and tube clamping means. The coated portions of the fibers extended from tubing 43 and 43'. Vacuum V was applied to coupler preform 31 by directing air pressure against tubing 43 and 43' as indicated by arrows 44, 44', thereby clamping the tubing against the fibers extending therethrough.

With a vacuum of 61 cm of mercury connected to the tube bore, ring burner 34 was ignited. Flames were generated by supplying gas and oxygen to the burner at rates of 0.45 slpm and 0.90 slpm, respectively. The flame from ring burner 34 heated tube 10 for about 12 seconds. Midregion 27 of the matrix glass collapsed onto fibers 19 and 20 as shown in FIG. 9.

After the tube cooled, the burner was reignited, the flow rates of both the gas and oxygen remaining the same. The flames heated the center of the collapsed region to the softening of the materials thereof. After 8 to 10 seconds, the supply of oxygen to burner 34 was turned off. Stages 45 and 46 were pulled in opposite directions at a combined rate of 1.0 cm/sec to elongate tube 10 by 0.65 cm to form neckdown region 51 (FIG. 10), the length and diameter of which were sufficient to achieve the desired optical characteristics in a single stretching operation.

After the coupler cooled, the vacuum lines were removed, and drops 48 and 49 of adhesive were applied to ends 14 and 15 of the tube. The adhesive was cured by exposure to UV light, and the coupler was removed from the chucks.

The spectral insertion loss curves for a switch made in accordance with Example 1 are shown in FIG. 11. Curve $P_2$ represents the coupled power. The excess loss for that switch was 1.6 dB and 2.4 dB at 1290 nm and 1560 nm, respectively. The double peak in the coupling ratio curves of FIG. 11 characterizes the resultant device as an ideal double window switch coupler. Approximately 91% of the total power propagating in the two fibers 17 and 18 at end 15 is guided by optical fiber 18 at 1290 nm and approximately 99% of the power is guided by output fiber 18 1560 nm. Couplers made in accordance with Example 1 exhibited a median excess device loss of about 2 dB. The lowest measured excess loss was 1.4 dB.

EXAMPLE 2

Figure 12:
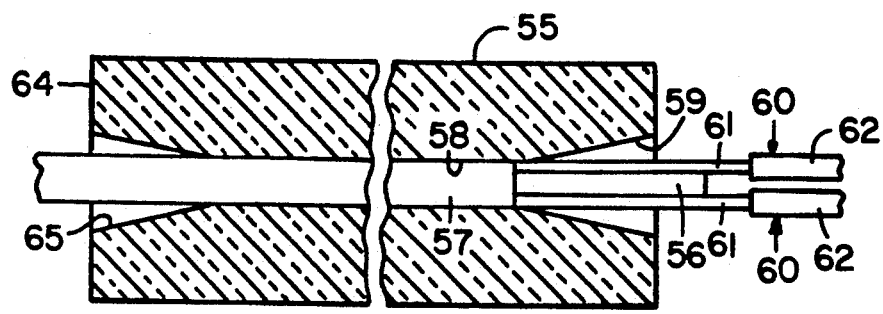
FIG. 12 is a cross-sectional view of a capillary tube illustrating a fiber insertion step.

A 1×8 achromatic splitter was made by a method similar to that described in Example 1 except for the following differences. A glass tube 55 (FIGS. 12 and 14) having a 3.8 cm length, 2.8 mm outside diameter, and 465 μm longitudinal bore diameter was employed; it was formed of silica doped with about 0.5 wt. % $B_2O_3$, the being relatively uniform throughout its radius. The composition of tube 55 was determined by wet chemistry; $\Delta_{2-3}$ was then extrapolated to be 0.022% at 1300 nm from a known relationship between refractive index and $B_2O_3$ content.

Since only six optical fibers can fit around another fiber of equal diameter, a glass spacer tube must be placed around a central fiber to permit seven or more fibers to be equally spaced around the central one. A spacer tube having an outside diameter of 205 μm and an inside diameter of 130 μm can be used with eight optical fibers having an outside diameter of 125 μm. A length of coated spacer tube can be used as a tool for initially inserting the eight fibers around the surface of the tube bore. A length of spacer tube was provided with a urethane acrylate coating having an outside diameter of 450 μm. About 2.5 cm of coating was stripped from the end of a piece 56 of spacer tube. The uncoated end of the spacer tube was inserted a sufficient distance into end 64 of tube 55 to ensure that the end of coating 57 wa located in bore 58 a short distance beyond funnel 59.

Nine 1.5 m long optical fibers were provided with 3.2 cm long stripped ends, the endfaces of which had antireflection terminations. Eight optical fibers 61 were inserted into bore 58 around spacer tube 56 until they contacted coating 57. The eight fibers were moved together toward end 64 of tube 55 until the fiber coatings 62 were in funnel 59. The coated spacer tube was then removed. The ends of a 32 mm long piece of spacer tube 72 were fire polished to round off any sharp edges. Spacer tube 72 was composed of $SiO_2$ doped with 0.5 wt. % $B_2O_3$ throughout its radius. The uncoated end 70 of the ninth fiber 71 was inserted into spacer tube 72 (FIG. 13), and the resultant combination was inserted through funnel 65 and into the cavity at the center of the eight fibers 61 from which spacer tube 56 had been removed. The insertion step was continued until coating 73 reached the vicinity of the small diameter end of funnel 65. A fragmentary cross-sectional view of the resultant preform is shown in FIG. 14. A small amount of UV-curable adhesive was applied to hold the fibers in place.

Vacuum was applied to one end of the tube bore and several drops of ethyl alcohol were applied to the other end to wash out debris. After the preform was put in the chucks, a vacuum of 45.7 cm of mercury was connected to both ends of the tube bore, and the burner was ignited for a 1 second burn to evaporate the alcohol.

With gas and oxygen flowing to the burner at rates of 0.55 slpm and 1.10 slpm, respectively, the flame heated the tube for about 18 seconds to collapse the matrix glass onto the fibers. After the tube cooled, with flow rates of gas and oxygen remaining the same; the burner was reignited. The flame heated the central portion of the collapsed region, and after 10 seconds, the supply of oxygen to burner 34 was turned off. Stages 45 and 46 were pulled in opposite directions at a combined rate of 1.0 cm/sec until the central portion of midregion 27 was stretched 0.8 cm.

Figure 15:
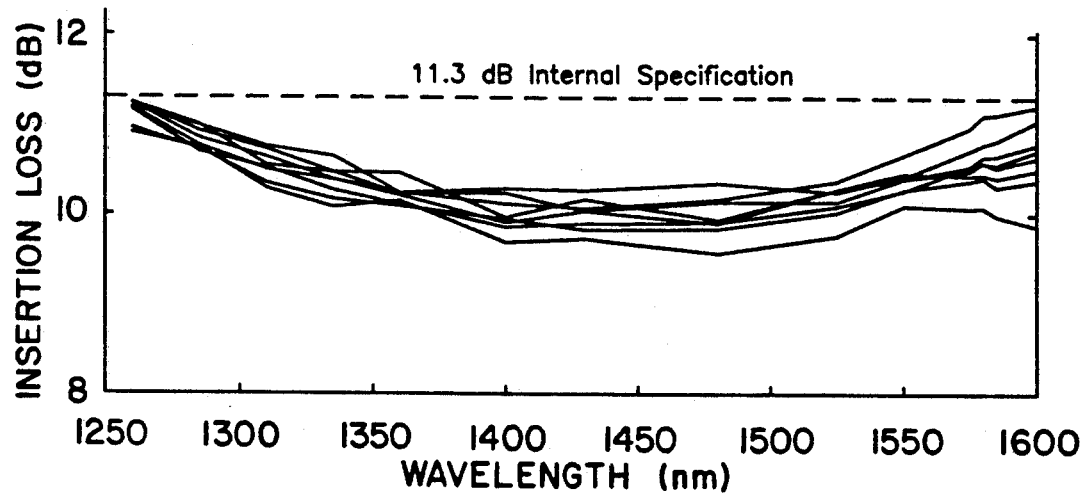
FIG. 15 is a graph illustrating spectral coupling ratio curves for an achromatic 1×8 coupler produced by the method of Example 2.

The spectral insertion loss curves for a specific 1×8 splitter made in accordance with Example 2 are shown in FIG. 15. The curves represent the power coupled to each of the eight ring fibers. The excess loss for that coupler was 1.9 dB and 1.7 dB at 1310 nm and 1550 nm, respectively. The insertion loss was less than 11.3 dB in each output leg of that coupler over a wavelength range greater than 320 nm Couplers made in accordance with this example generally exhibited a minimum excess device loss of about 1.0 dB at 1430 nm. The lowest measured excess loss was 0.8 dB.

EXAMPLE 3

Figure 16:
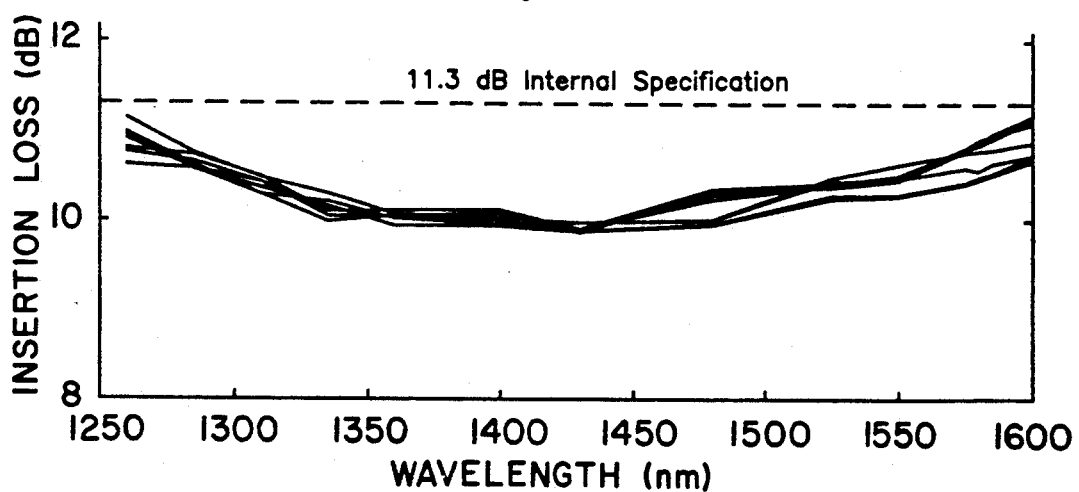
FIG. 16 is a graph illustrating spectral coupling ratio curves for an achromatic 1×8 coupler produced by the method of Example 3.

A 1×8 coupler was made by a method similar to that described in Example 2 (immediately above), except that the tube had a radial composition gradient. A 300 μm thick region at adjacent the bore (from $r_{is}$ to $r_t$ of FIG. 6) was composed of $SiO_2$ doped with 0.5 wt. % $B_2O_3$. The value of $\Delta_{2-3}$ was extrapolated to be 0.022% at 1300 nm. The remainder of the tube was composed of $SiO_2$ doped with 8.2 wt. % $B_2O_3$. The spectral insertion loss curves are shown in FIG. 16. The excess loss for that coupler was 1.8 dB, 0.9 dB and 2.0 dB at 1310 nm, 1430 and 1550 nm, respectively. The insertion loss was less than 11.1 dB in each output leg of that coupler over a 300 nm range of wavelengths up to about 1565 nm.

EXAMPLE 4

A 1×6 coupler was made by a method similar to that described in Example 2, except for the following differences. A glass capillary tube having a 3.8 cm length, 2.8 mm outside diameter, and 380 μm longitudinal bore diameter was employed; it was formed of silica doped with 8.0 wt. % $B_2O_3$ and 2.5 wt. % $GeO_2$, the composition being relatively uniform throughout its radius. The value of $\Delta_{2-3}$ was 0.02% at 1300 nm. Since six ring fibers can be equally spaced around a central fiber of equal diameter, no spacer ring was used. The fiber insertion tool was merely a piece of 125 μm outside diameter optical fiber having a 350 μm diameter urethane acrylate coating; about 2.5 cm of coating was stripped from the end of the fiber. This "fiber" tool was used in the same manner as the "spacer tube" tool described in connection with FIG. 12 to insert the six fibers around the inner surface of the capillary tube. The tool was removed and was replaced by the central fiber. A vacuum of 45.7 cm of mercury was applied to the tube bore during the tube collapse step.

With gas and oxygen flowing to the burner at rates of 0.55 slpm and 1.1 slpm, respectively, the flame heated the tube for about 18 seconds to collapse it onto the fibers. After the tube cooled, with flow rates of gas and oxygen remaining the same; the burner was reignited. After the central portion of the collapsed region was heated for 10 seconds, the supply of oxygen to the burner was turned off. Stages 45 and 46 were pulled in opposite directions at a combined rate of 1.0 cm/sec until the central portion of midregion 27 was stretched 0.6 cm.

Figure 17:
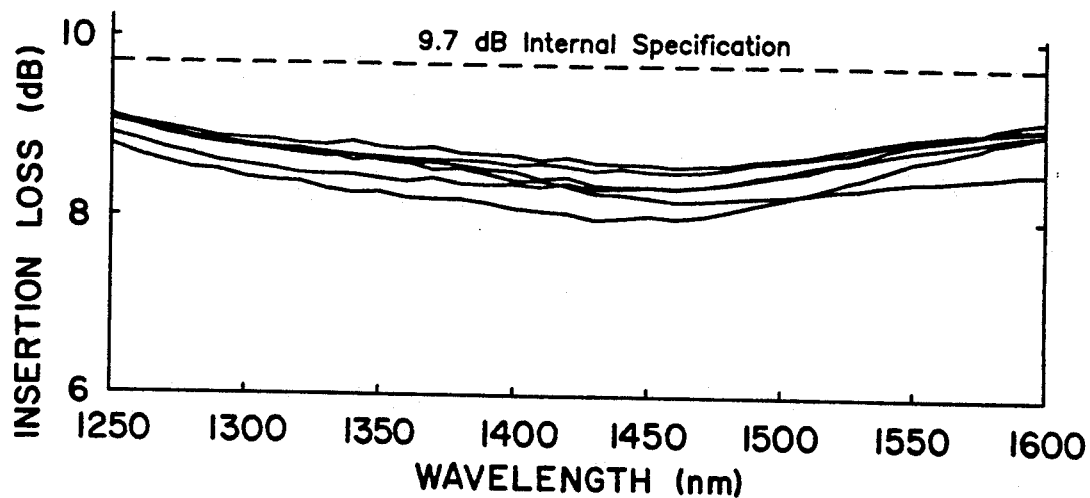
FIG. 17 is a graph illustrating spectral coupling ratio curves for an achromatic 1×6 coupler produced by the method of Example 4.

The spectral insertion loss curves are shown in FIG. 17. The minimum excess loss for that coupler was 0.54 dB at 1460 nm. The insertion loss was less than 9.1 dB in each output leg of that coupler from 1260 nm to 1580 nm and was less than 9.0 nm from 1285 nm to 1575 nm. The absolute slope was 0.0033 dB/nm [0.010 %/nm] at 1310 nm and was 0.0043 dB/nm [0.013%/nm] at 1550 nm.

EXAMPLE 5

Figure 18:
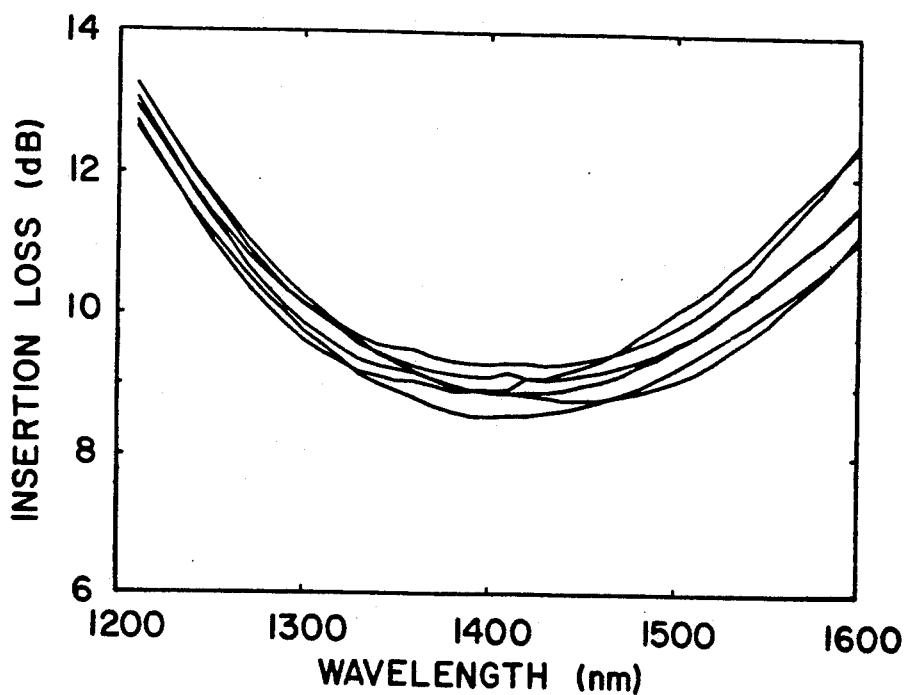
FIG. 18 is a graph illustrating spectral coupling ratio curves for a non-achromatic 1×6 coupler produced by the methods of Example 5.

For comparison purposes, a 1×6 coupler was made by a method similar to that described in Example 4 except that the tube refractive index was such that $\Delta_{2-3}$ was about 0.5%. Tube composition in the region adjacent the bore was $SiO_2$ doped with 2 wt. % $B_2O_3$ and 2 wt. % F. The resultant coupler exhibited higher insertion loss (see FIG. 18) and the spectral insertion loss curves exhibited greater slope than the coupler of Example 4. Various fiber packing arrangements are illustrated in connection with the specific examples. The modifications discussed below in connection with FIGS. 19-21 can be used in the manufacture other kinds of 1×N couplers or splitters. In these figures, a small circle concentrically within a large circle represents a core in an optical fiber. A large circle having no smaller circle within it represents a "dummy" fiber having no core and a length that is slightly shorter than the tube. The composition of the dummy fiber is such that its refractive index is the same or about the same as that of the tube. The dummy fibers could be formed of the same material as the tube.

Figure 19:
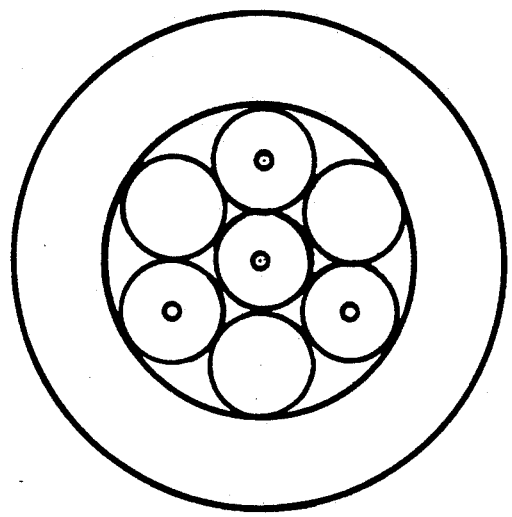
FIGS. 19-21 illustrate the arrangement of N ring fibers around an input fiber in a splitter wherein N>2.

The fibers in a 1×3 splitter can be arranged as shown in FIG. 19. The coupler preform is stretched until all of the power couples from the central fiber to the three ring fibers at the wavelength or wavelengths of interest, depending on whether the device is to operate at one or two windows.

The arrangement of FIG. 19 would also be used in a 1×4 splitter if, after the stretching operation is completed, the same amount of power remains in the central fiber as is coupled to each of the three ring fibers.

Figure 20:
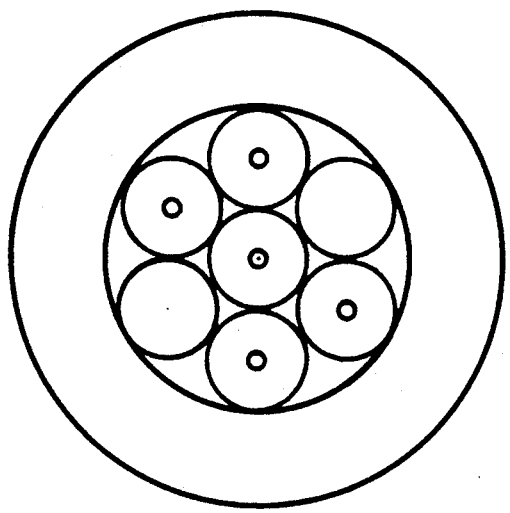

The arrangement of FIG. 20 can similarly be used to make a 1×4 splitter (by stretching so that all of the power couples from the central fiber to the four ring fibers) or a 1×5 splitter if, after the stretching operation completed, the same amount of power remains in the central fiber as is coupled to each of the four ring fibers.

Figure 21:
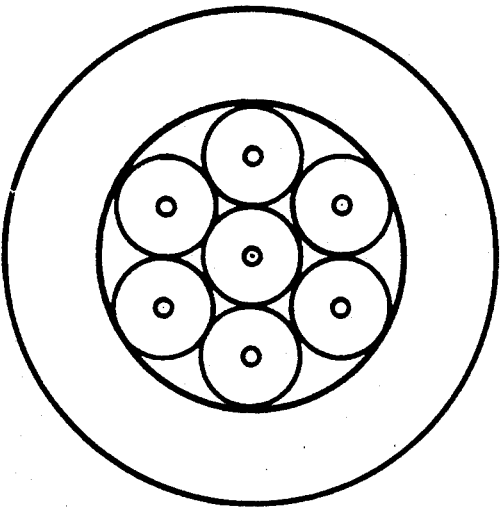

In a similar manner, the fiber arrangement of FIG. 21 can be used to form a 1×6 or a 1×7 splitter.

It may be possible to apply the principles of the present invention to fused fiber couplers by first fusing and stretching a plurality of optical fibers and thereafter potting or immersing the coupling region in an optical medium of proper refractive index such as oil, epoxy or the like. A disadvantage of such a coupler may be a sensitivity of the refractive index of the optical medium to temperature.

What is claimed is:

1. A coupler comprising
a body of matrix glass, and
a plurality of optical waveguide paths extending through said body, each of said paths comprising a core region surrounded by a cladding region of refractive index less than that of said core region, the lowest refractive index of the cladding regions of said paths being $n_2$,
at least a portion of one of said optical waveguide paths being disposed in close proximity to another of said paths to form a coupling region,
the refractive index of at least that region of said body adjacent said paths being $n_3$, where $n_3$ is lower than $n_2$ by such an amount that the value of $\Delta_{2-3}$ is less than 0.125%, wherein $\Delta_{2-3}$ equals $(n_2^2 - n_3^2)/2n_2^2$.

2. A coupler in accordance with claim 1 wherein said waveguide paths comprise optical fibers.

3. A coupler in accordance with claim 2 wherein said matrix glass is a cylindrically-shaped body through which said fibers longitudinally extend, said body having first and second opposed ends and a midregion, the diameter of the central portion of said midregion and the diameters of said optical fibers in said central portion of said midregion being smaller than the diameters thereof at the ends of said body.

4. A fiber optic coupler comprising
an elongated body of matrix glass, said body having first and second opposed ends and a midregion,
a plurality of optical fibers extending longitudinally through said body, each of said fibers comprising a core surrounded by a cladding of refractive index less than that of said core, the lowest refractive index of the claddings of said plurality of optical fibers being $n_2$,
the refractive index that region of said body adjacent said fibers being $n_3$, where $n_3$ is lower than $n_2$ by such an amount that the value of $\Delta_{2-3}$ is less than 0.125%, wherein $\Delta_{2-3}$ equals $(n_2^2 - n_3^2)/2n_2^2$,
the diameter of the central portion of said midregion and the diameters of said optical fibers in said central portion of said midregion being smaller than the diameters thereof at the ends of said body, whereby a portion of the optical power propagating in one of said fibers couples to the other of said fibers.

5. A fiber optic coupler in accordance with claim 4 wherein M optical fibers extend from said first end of said body and N optical fibers extend from said second end of said body, wherein $M \geq 1$ and $N \geq 2$.

6. A fiber optic coupler in accordance with claim 4 wherein the cladding refractive index $n_2'$ of at least one of said fibers is greater than $n_2$ by an amount such that $\Delta_{clads}$ is no greater than 0.03%, wherein $\Delta_{clads}$ is $(n_2^2 - n_2'^2)/2n_2^2$.

7. A fiber optic coupler in accordance with claim 4 wherein said matrix glass comprises $SiO_2$ doped with up to 2.8 wt. % $B_2O_3$.

8. A coupler in accordance with claim 4 wherein said matrix glass is a cylindrically-shaped body.

9. A fiber coupler in accordance with claim 8 wherein M optical fibers extend from said first end of said body and N optical fibers extend from said second end of said body, wherein $M \geq 1$ and $N \geq 2$.

10. A fiber optic coupler in accordance with claim 8, wherein the cladding refractive index $n_2'$ of at least one of said fibers is greater than $n_2$ by an amount such that $\Delta_{clads}$ is no greater than 0.03%, wherein $\Delta_{clads}$ is $(n_2^2 - n_2'^2)/2n_2^2$.

11. A fiber optic coupler in accordance with claim 8 wherein said matrix glass comprises $SiO_2$ doped with up to 2.8 wt. % $B_2O_3$.

12. In an optical coupler of the type comprising at least two adjacent waveguide paths that are elongated and in close proximity to one another in a narrowed coupling region to induce coupling between said waveguide paths, each of said waveguide paths comprising a core region surrounded by a cladding region of refractive index less than that of said core region, the lowest refractive index of the cladding regions of said waveguides being $n_2$, said coupling region being surrounded by matrix material of refractive index $n_3$, the improvement wherein $n_3$ is lower than $n_2$ by such an amount that the value of $\Delta_{2-3}$ is less than 0.125%, wherein $\Delta_{2-3}$ equals $(n_2^2 - n_3^2)/2n_2^2$.

13. A coupler in accordance with claim 12 wherein said waveguide paths comprise optical fibers.

14. A coupler in accordance with claim 13 wherein said matrix glass is an elongated body through which said fibers longitudinally extend, said body having first and second opposed ends and a midregion, the diameter of the central portion of said midregion and the diameters of said optical fibers in said central portion of said midregion being smaller than the diameters thereof at the ends of said body.

15. A coupler in accordance with claim 14 wherein said body is cylindrically-shaped.

* * * * *